(12) United States Patent
Kendrick

(10) Patent No.: US 10,920,520 B2
(45) Date of Patent: Feb. 16, 2021

(54) PLUG AND PUMP SYSTEM FOR ROUTING PRESSURIZED FLUID

(71) Applicant: Halliburton Energy Services, Inc., Houston, TX (US)

(72) Inventor: William D. Kendrick, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 728 days.

(21) Appl. No.: 15/707,544

(22) Filed: Sep. 18, 2017

(65) Prior Publication Data

US 2018/0003323 A1 Jan. 4, 2018

Related U.S. Application Data

(60) Continuation of application No. 14/086,546, filed on Nov. 21, 2013, now abandoned, which is a division of
(Continued)

(51) Int. Cl.
| | |
|---|---|
| *E21B 33/068* | (2006.01) |
| *F16L 23/036* | (2006.01) |
| *F16L 23/08* | (2006.01) |
| *E21B 43/26* | (2006.01) |
| *F16L 27/08* | (2006.01) |
| *E21B 21/06* | (2006.01) |
(Continued)

(52) U.S. Cl.
CPC ............ *E21B 33/068* (2013.01); *E21B 21/02* (2013.01); *E21B 21/06* (2013.01); *E21B 43/26* (2013.01); *F16L 23/036* (2013.01); *F16L 23/08* (2013.01); *F16L 23/22* (2013.01); *F16L 27/0804* (2013.01); *Y10T 137/0318* (2015.04); *Y10T 137/85978* (2015.04); *Y10T 137/8807* (2015.04)

(58) Field of Classification Search
CPC ........ E21B 33/068; E21B 21/02; E21B 43/26; Y10T 137/8807
See application file for complete search history.

(56) References Cited

U.S. PATENT DOCUMENTS 3,217,748 A * 11/1965 Harper .................... B67D 9/02
  137/615
3,422,895 A * 1/1969 Koonce .................. E21B 23/08
  166/79.1
(Continued)

FOREIGN PATENT DOCUMENTS

WO 2009130440 A2 10/2009

OTHER PUBLICATIONS

Dictionary definition of "crane" accessed Jun. 11, 2020 via dictionary.com.*

(Continued)

*Primary Examiner* — Blake E Michener
(74) *Attorney, Agent, or Firm* — John W. Wustenberg; Baker Botts L.L.P.

(57) ABSTRACT

A plug and pump system for routing pressurized fluid from a fluid source is disclosed. The system includes a platform and a docking station interface mounted on the platform and including multiple points of articulation. A wellhead interface is mounted on the platform and includes multiple points of articulation. The docking station interface and the wellhead interface are configured to route pressurized fluid from a fluid source.

20 Claims, 6 Drawing Sheets

Related U.S. Application Data application No. 13/041,656, filed on Mar. 7, 2011, now Pat. No. 8,590,556.

(51) Int. Cl.
*F16L 23/22* (2006.01)
*E21B 21/02* (2006.01)

(56) References Cited

U.S. PATENT DOCUMENTS

| | | | |
|---|---|---|---|
| 3,554,581 A | 1/1971 | Mason et al. | |
| 3,680,188 A | 8/1972 | Mason et al. | |
| 3,712,330 A | 1/1973 | Davis | |
| 3,776,578 A | 12/1973 | Jessup et al. | |
| 3,967,841 A | 7/1976 | Kendrick et al. | |
| 3,967,842 A | 7/1976 | Kendrick | |
| 4,130,134 A * | 12/1978 | Castle | B67D 7/002 |
| | | | 137/615 |
| 4,146,261 A | 3/1979 | Edmaier et al. | |
| 4,218,080 A | 8/1980 | Kendrick | |
| 4,337,971 A | 7/1982 | Kendrick | |
| 4,354,698 A | 10/1982 | Linder et al. | |
| 4,391,297 A * | 7/1983 | Knight | E21B 43/26 |
| | | | 137/615 |
| 4,457,338 A * | 7/1984 | Moller | E21B 43/26 |
| | | | 137/615 |
| 4,468,166 A | 8/1984 | Jameson | |
| 4,474,213 A * | 10/1984 | Jameson | E21B 43/26 |
| | | | 137/615 |
| 4,502,505 A | 3/1985 | Moller | |
| 4,548,236 A * | 10/1985 | Bloomquist | F16L 3/015 |
| | | | 137/615 |
| 4,570,673 A | 2/1986 | Kendrick et al. | |
| 4,603,887 A | 8/1986 | Mayfield et al. | |
| 4,828,033 A | 5/1989 | Frison | |
| 5,947,533 A | 9/1999 | Fisher et al. | |
| 6,701,980 B2 | 3/2004 | Rothrock | |
| 7,204,525 B2 | 4/2007 | Matzner | |
| 7,549,681 B1 | 6/2009 | Matzner | |
| 8,191,933 B2 | 6/2012 | Rao et al. | |
| 9,004,104 B2 * | 4/2015 | Ungchusri | E21B 43/26 |
| | | | 137/615 |
| 10,302,079 B2 * | 5/2019 | Kendrick | E21B 43/26 |
| 10,436,368 B2 * | 10/2019 | Kajaria | B60P 3/2265 |
| 10,466,719 B2 * | 11/2019 | Kibler | E21B 43/26 |
| 10,480,300 B2 * | 11/2019 | Guidry | E21B 43/26 |
| 10,648,269 B2 * | 5/2020 | Painter | E21B 34/02 |
| 2005/0242584 A1 | 11/2005 | Matzner | |
| 2006/0181081 A1 | 8/2006 | Maztner et al. | |
| 2007/0084514 A1 * | 4/2007 | Perratone | B67D 9/02 |
| | | | 137/615 |
| 2007/0215543 A1 | 6/2007 | McNeel et al. | |
| 2008/0029267 A1 | 2/2008 | Shampine et al. | |
| 2009/0261575 A1 | 10/2009 | Bull et al. | |
| 2009/0295155 A1 | 12/2009 | Keller-Staub et al. | |
| 2009/0308589 A1 * | 12/2009 | Bruins | E21B 33/068 |
| | | | 166/75.11 |
| 2010/0193057 A1 * | 8/2010 | Garner | E21B 33/13 |
| | | | 137/615 |
| 2012/0060929 A1 * | 3/2012 | Kendrick | F04D 29/4293 |
| | | | 137/1 |
| 2012/0227814 A1 * | 9/2012 | Kendrick | F16L 23/22 |
| | | | 137/1 |
| 2015/0069755 A1 * | 3/2015 | Bull | E21B 33/038 |
| | | | 285/406 |
| 2017/0122060 A1 * | 5/2017 | Dille | B60P 3/2205 |
| 2017/0159654 A1 * | 6/2017 | Kendrick | E21B 43/26 |
| 2018/0298713 A1 * | 10/2018 | Bull | E21B 33/072 |

OTHER PUBLICATIONS

FMC Technologies, Articulating Frac Arm (Patent Pending), Increased Efficiency and Safety in Frac Applications, 2009.
Grayloc Products, Houston, Texas, and 4" Halliburton Big Inch Clamp Connection, (prior to 2004.).
KZ-26, CIFA S.p.A. Sep. 2007.
Weir SPM, Safety Iron™ Manifold Trailer, Sep. 2008.
Weir SPM, Safety Iron® Manifold Trailer, Jan. 2009.

* cited by examiner

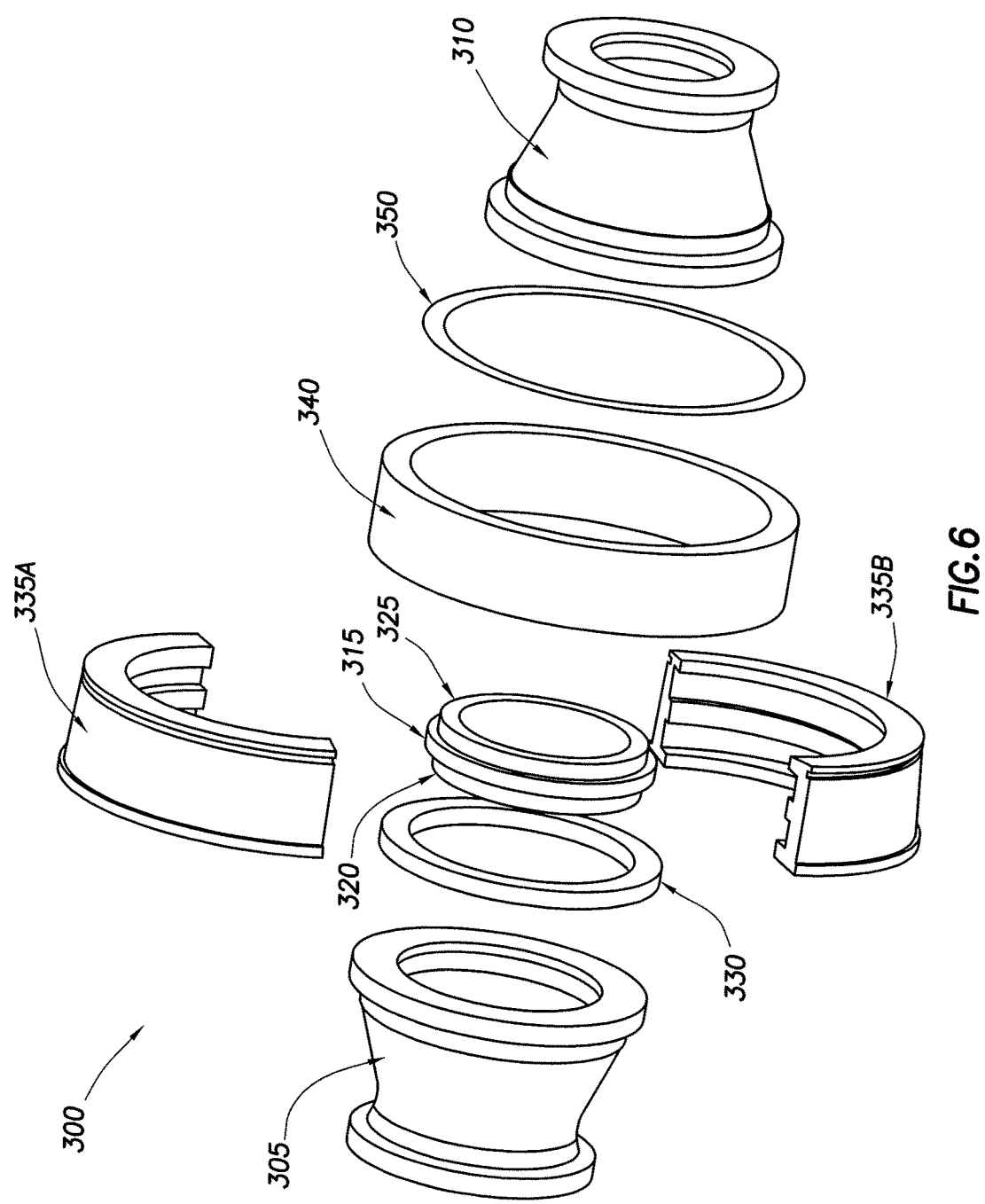

PLUG AND PUMP SYSTEM FOR ROUTING PRESSURIZED FLUID

CROSS-REFERENCE TO RELATED APPLICATIONS

The present invention is a continuation application of U.S. patent application Ser. No. 14/086,546 entitled "Plug and Pump System for Routing Pressurized Fluid," filed on Nov. 21, 2013 which is a divisional of U.S. patent application Ser. No. 13/041,656 entitled "Plug and Pump System for Routing Pressurized Fluid," filed on Mar. 7, 2011 and issued as U.S. Pat. No. 8,590,556 on Nov. 26, 2013, the entire disclosures of which are incorporated herein by reference.

BACKGROUND

The present disclosure generally relates to systems and methods for routing fluids applicable to well operations and, at least in some embodiments, to systems and methods for routing fluids to wellheads.

At a drilling site, there is often a need for conveying fluids at high pressure (e.g., 5,000-20,000 pounds per square inch working pressure) between fluid delivery system components. Assemblies having parallel-connected rigid interconnections have been used to facilitate the delivery of fluids under high-pressure. These rigid interconnections typically utilize standardized pipes (known as "straight discharge joints") and fittings, customizing the number of parallel lines and the number of straight discharge joints per line for the needs of each particular site. For example, four to six lines of pipe that is about 3 or 4 inches in diameter may be required.

Connections from the wellhead to the docking station sometimes extend up to hundreds of feet. For delivery of fluids under substantial pressure, the connections may be staked securely to the ground. Connecting to the wellhead also often involves working several feet above ground level—often an unsafe and hazardous operation. Discharge joints and fittings are typically individually transported, unloaded from a transport vehicle, carried, connected, unconnected, and reloaded onto a transport vehicle. This often requires substantial time and effort and is associated with significant hazards.

Swivels and elbows are often used to allow adjustment between fixed components. However, in many applications, the added weight and area required for these connections is disadvantageous. Adjustment of the pipe configuration for size and orientation can significantly slow the fabrication and assembly of the installation, resulting in the loss of time, labor, and financial resources. Also, a greater number of fittings results in a greater number of potential leak points. And many conventional systems attempt to prevent pipe erosion damage by distributing fluid volumes to multiple parallel lines, thereby dividing the fluid volume sustained by each line.

Fittings between straight discharge joints often utilize connecting or tightening devices, such as hammer unions. Hammer unions may be tightened using a hammer to hit the lugs on the wing union nut. Space constraints and sometimes location often make the rotation of the threaded devices difficult. For example, in confined spaces and/or in elevated locations, it is often difficult to hammer the wing nut. Oftentimes, the hammer will glance off the lug or will miss the lug completely. Such situations can be a safety hazard to the operator and may also cause damage to other personnel or to other equipment.

SUMMARY

The present disclosure generally relates to systems and methods for routing fluids applicable to well operations and, at least in some embodiments, to systems and methods for routing fluids to wellheads.

In one aspect, a plug and pump system for routing pressurized fluid from a fluid source is disclosed. The system includes a platform and a docking station interface mounted on the platform and including multiple points of articulation. A wellhead interface is mounted on the platform and includes multiple points of articulation. The docking station interface and the wellhead interface are configured to route pressurized fluid from a fluid source.

In another aspect, a mobile plug and pump system for routing pressurized fluid from a fluid source is disclosed. The system includes a vehicle and a first articulating piping assembly mounted on the vehicle and including a first pressure-locking swivel assembly. A second articulating piping assembly is mounted on the vehicle and includes a second pressure-locking swivel assembly. The first articulating piping assembly and the second articulating piping assembly are configured to cooperatively route pressurized fluid.

In yet another aspect, a method for routing pressurized fluid from a fluid source is disclosed. The method includes attaching a docking station line of a plug and pump system to a docking station and attaching a wellhead line of the plug and pump system to a wellhead. The method further includes flowing fluid through one or more of the docking station line and the wellhead line, where the plug and pump system includes a platform. The docking station line is mounted on the platform and includes a first pressure-locking swivel assembly. The wellhead line is mounted on the platform and includes a second pressure-locking swivel assembly. The docking station line and the wellhead line each include high-pressure piping. The docking station line and the wellhead line are configured to allow fluid to flow between the two lines.

In still another aspect, a pressure-locking swivel assembly is disclosed. The pressure-locking swivel assembly includes a first hub having a first cavity extending therethrough and a second hub having a second cavity extending therethrough, the second hub disposed generally opposite the first hub. The pressure-locking swivel assembly also includes an external retainment assembly disposed about a first hub portion of the first hub and a second hub portion of the second hub. At least one of the first and second hubs is rotatable when the first and second hubs do not bear an internal fluid pressure. Rotation of the at least one of the first and second hubs is inhibited when the first and second hubs bear a second internal fluid pressure.

The features and advantages of the present disclosure will be apparent to those skilled in the art. While numerous changes may be made by those skilled in the art, such changes are within the spirit of the invention.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features. These drawings illustrate certain aspects of some of the embodiments of the present invention, and should not be used to limit or define the invention. It should be understood that, for the sake of clarity, certain elements may have been omitted from the drawings.

FIG. 6 shows an exploded view of that pressure-locking swivel assembly.

DESCRIPTION

Figure 1:
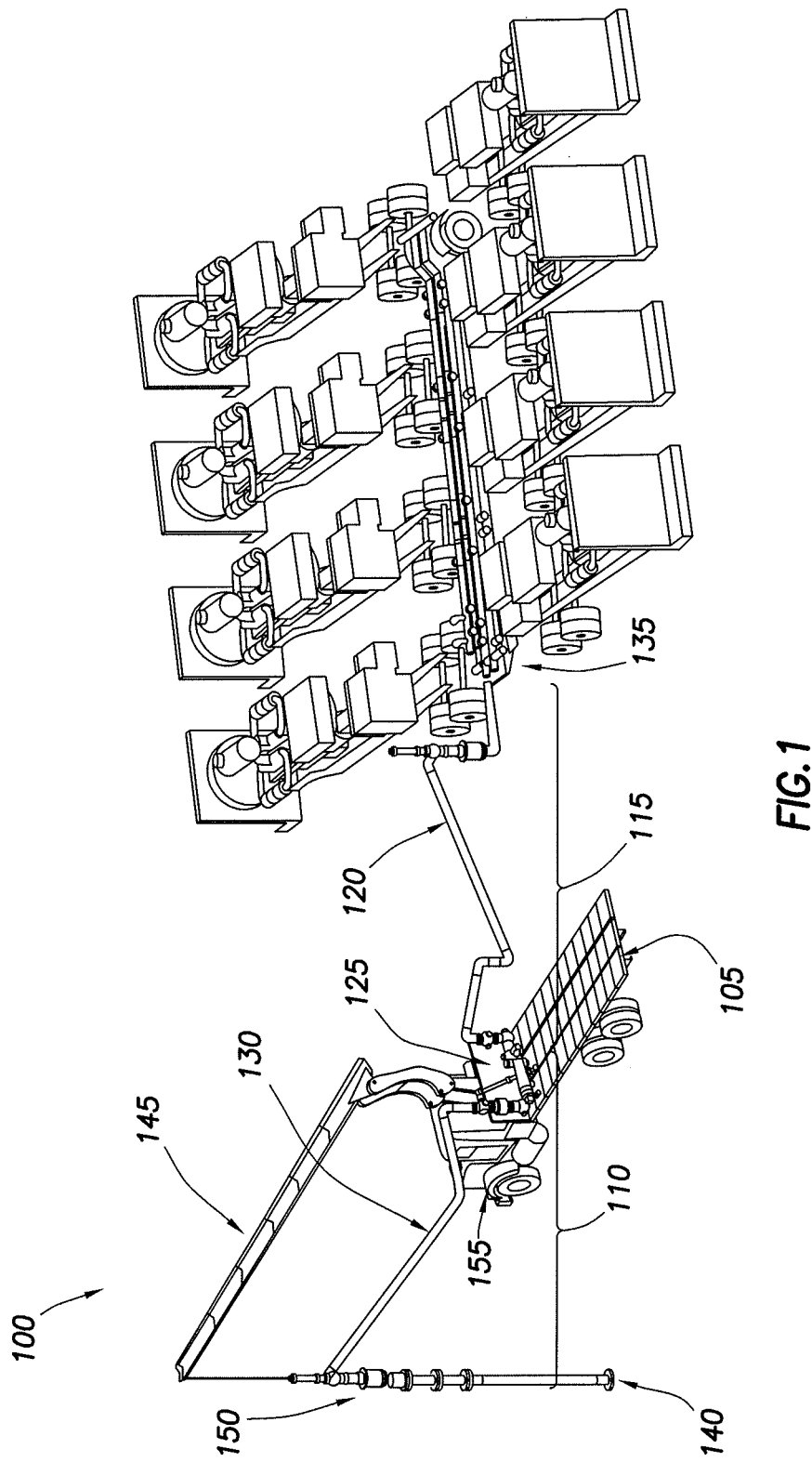
FIG. 1 illustrates a schematic perspective view of one example plug and pump system, in accordance with certain embodiments of the present disclosure.

The present disclosure generally relates to systems and methods for routing fluids applicable to well operations and, at least in some embodiments, to systems and methods for routing fluids to wellheads.

Illustrative embodiments of the present disclosure are described in detail herein. In the interest of clarity, not all features of an actual implementation are described in this specification. It will of course be appreciated that in the development of any such actual embodiment, numerous implementation-specific decisions must be made to achieve developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Certain embodiments according to the present disclosure provide for plug and pump systems. One purpose of plug and pump systems according to embodiments of this disclosure is to reduce health, safety, and/or environmental risks associated with rigging up, rigging down, and operating fluid delivery system equipment when connecting a docking station to a wellhead. For example, minimizing health and safety risks may be achieved by reducing lifting, carrying, and hammering during rig-up and rig-down; minimizing environmental hazards may be achieved by reducing potential leak points between a docking station and a wellhead. Another purpose of plug and pump systems according to embodiments of this disclosure is to provide value to customers or end-users by minimizing down time and job interruptions, while maximizing efficiency of rig-up/rig-down and maximizing reliability of operation.

As used herein, the term "docking station" generally refers to an interface to a well site arrangement that may include a manifold system-located, at least temporarily, at the well site—that may connect directly or indirectly to one or more pumps, reservoirs, storage bins, blending equipment, and/or other components of a fluid preparation and delivery system. Another purpose is to decrease the amount of time required to rig up and rig down discharge manifold equipment from a docking station to a wellhead. Yet another purpose is to decrease the number of potential leak points between a docking station and a wellhead. Each of these purposes also contributes to an overall reduction in operating expenses.

Conventional rig-up systems might comprise four lines, each four inches in diameter, between the discharge manifold of a docking station and the wellhead. Depending on the dimensions and layout of the drill site, several straight discharge joints may be required for each line. A hammer union typically would be required at each end of each straight discharge joint and other necessary components during rig-up; a disunion typically would be required during rig-down. For example, in the case of four or five straight discharge joints for each line, this may result in twelve or more opportunities for hammer injuries per line. Similarly, each union and each disunion typically requires a heavy lift, resulting in twelve or more opportunities for heavy lift injuries per line. And, overall, such conventional systems might provide 100 or more opportunities for injury during rig-up/down, for example. Moreover, there could be other fittings in such lines that further increase the opportunities for injury.

In contrast, according to an embodiment of the invention, a plug and pump system would require only a single, manually implemented connection of a wellhead flange adapter. Opportunities for injury would therefore include only (1) lifting to connect the adapter, (2) connecting the adapter, (3) disconnecting the adapter, and (4) lifting to remove the adapter. Generally, a plug and pump system comprises a number of elements working in concert towards achieving the aforementioned advantages while conforming to the dimensions and layout of various drill sites. For example without limitation, the distance between a docking station and a wellhead may be between about 5 feet and about 100 feet, and a wellhead height may be between about 5 feet and about 25 feet.

FIG. 1 shows a schematic perspective view of one example plug and pump system 100, in accordance with certain embodiments of the present disclosure. The system 100 may comprise a platform 105 on which the well interface 110 and the manifold interface 115 may be mounted. Fluid may flow between a docking station 135 and a wellhead 140 through: the manifold interface 115, including one or more docking station lines 120; the well interface 110, including one or more wellhead lines 130; and the interface equipment 125 between the manifold interface 115 and the well interface 110. Accordingly, the manifold interface 115, the interface equipment 125, and the well interface 110 are configured to be in fluid communication with each other, the docking station 135, and the wellhead 140.

To minimize the number of connections, the manifold interface 115 may comprise a single docking station line 120 capable of accessing one or more wellheads from a single platform position, and the well interface 110 may comprise a single wellhead line 130. The single lines may be capable of delivering fluid at similar rates and pressures that would have previously required multiple lines. In some embodiments, it may be advantageous to configure the plug and pump system 100 so that the piping between a wellhead 140 and a docking station 135 comprises more than a single line. For example, additional lines may be useful to provide higher fluid pumping rates, separated fluid flows, simultaneous bi-directional fluid flow, or system redundancy. Any optimum number of required lines may determined for a given set of operational conditions.

The well interface 110 and the manifold interface 115 may each include any components of a surface pipe string, including straight discharge joints, connections, couplings, elbows, swivel joints, valves, plugs, detectors and measurement equipment, etc. Exemplary suitable piping may include 7-inch, 10,000 psi wp (pounds per square inch working pressure) Big Inch® Flow Lines or any suitable piping of any suitable variation in ratings. Other suitable components may also include, for example without limitation, 7-inch, 10,000 psi wp hydraulic end connectors; 7-inch, 10,000 psi wp swivel connectors; 7-inch, 10,000 psi wp static connectors; 7-inch, 10,000 psi wp check valves; 4-inch, hydraulic relief valves; and 4-inch, 10,000 psi wp union connections with isolation valves. It should be understood that any suitable components of any suitable variation in ratings may be utilized in accordance with the present disclosure.

In some embodiments, the plug and pump system 100 may comprise large, high-flow-rate, high-pressure piping. For example, suitable piping may be between about 3 inches and about 10 inches in diameter. In certain embodiments, suitable piping may be about 7 inches in diameter. As would be understood by one of ordinary skill in the art with the benefit of this disclosure, larger diameter piping may be generally less flexible, thereby being more self-supporting.

As a nonlimiting example, suitable piping may be capable of delivering fluids at rates of over about 50 barrels per minute ("BPM"). In certain embodiments, suitable piping may be capable of delivering fluids at a rate of about 100 BPM. Suitable piping may be capable of withstanding fluid pressures of over about 5,000 pounds per square inch ("psi") working pressure ("wp"). In certain embodiments, suitable piping may be capable of withstanding fluid pressures of about 10,000 psi wp. In some embodiments, suitable piping may even be capable of withstanding fluid pressures of about 20,000 psi wp.

A crane 145 may be mounted on the platform 105 or on the vehicle chassis near the platform 105. The crane 145 may provide lifting, positioning, or support of components of the plug and pump system 100 during rig-up/down. The crane 145 also may be utilized to provide additional stability during pumping operations. The crane 145 may be similar in many respects to conventional industrial cranes. However, to meet the requirements of the plug and pump system 100, a suitable crane 145 may be sized to provide adequate lifting capacity for the large, high-flow-rate, high-pressure piping, while also being collapsible and lightweight to provide portability of the plug and pump system. By way of example without limitation, suitable cranes may be capable of lifting about 13,000 lbs. with a horizontal reach of about 10 feet retracted, and about 3,000 lbs. with a horizontal reach of about 44 feet extended. When stowed for transportation, the height of the crane 145 (above the platform 105) may be no more than about 7 feet; the width may be no more than about 8.25 feet, and the length may be no more than about 3.5 feet. The weight of the crane without counter weights may be no more than about 4 tons. Exemplary cranes, which may be suitable for certain embodiments, may include certain models provided by Cormach, for example, model number 27,700.

The platform 105 may be fixed, or it may be mounted on a mobile vehicle 155, such as a truck, trailer, rail car, dolly, boat, ship, barge, etc. The plug and pump system 100, thereby, may be capable of conveying fluids between the docking station 135 and the wellhead 140. It should be understood that the plug and pump system 100 may be capable of conveying fluids between one or more docking stations and one or more wellheads from a single or multiple vehicle positions. In embodiments wherein the platform 105 is mounted on a mobile vehicle 155, the vehicle 155 may be selected to better conform to the site-specific dimensions and layout. For example, in some embodiments, the vehicle 155 may be capable of parking in a space no more than about 8 feet by about 40 feet. An example of a suitable vehicle may be a Kenworth T800, or another similar commercially available vehicle.

In some embodiments, one or more quick connectors 150 may be utilized to connect the plug and pump system 100 to the docking station 135 or the wellhead 140. The quick connectors 150 may be locally or remotely operated. For example, the piping components of the well interface 110 and the manifold interface 115 may be fitted with one or more quick connectors 150. In many respects, quick connectors 150 may be similar to conventional quick connects. For example, a quick connector 150 may be of a large, conical shape to allow for a tolerance of several inches when positioning the quick connector 150 above the wellhead 140 with the crane 145. A suitable quick connector for some embodiments would include a conical-shaped seal. To improve ease and safety of use, suitable quick connectors may have a conical, or quasi-conical, section to accommodate and correct some initial misalignment of the connector and the wellhead 140, thereby facilitating proper final alignment. While quick connectors 150 may provide certain advantages, it should be understood that conventional manual connectors may be used in lieu of quick connectors 150.

Figure 2:
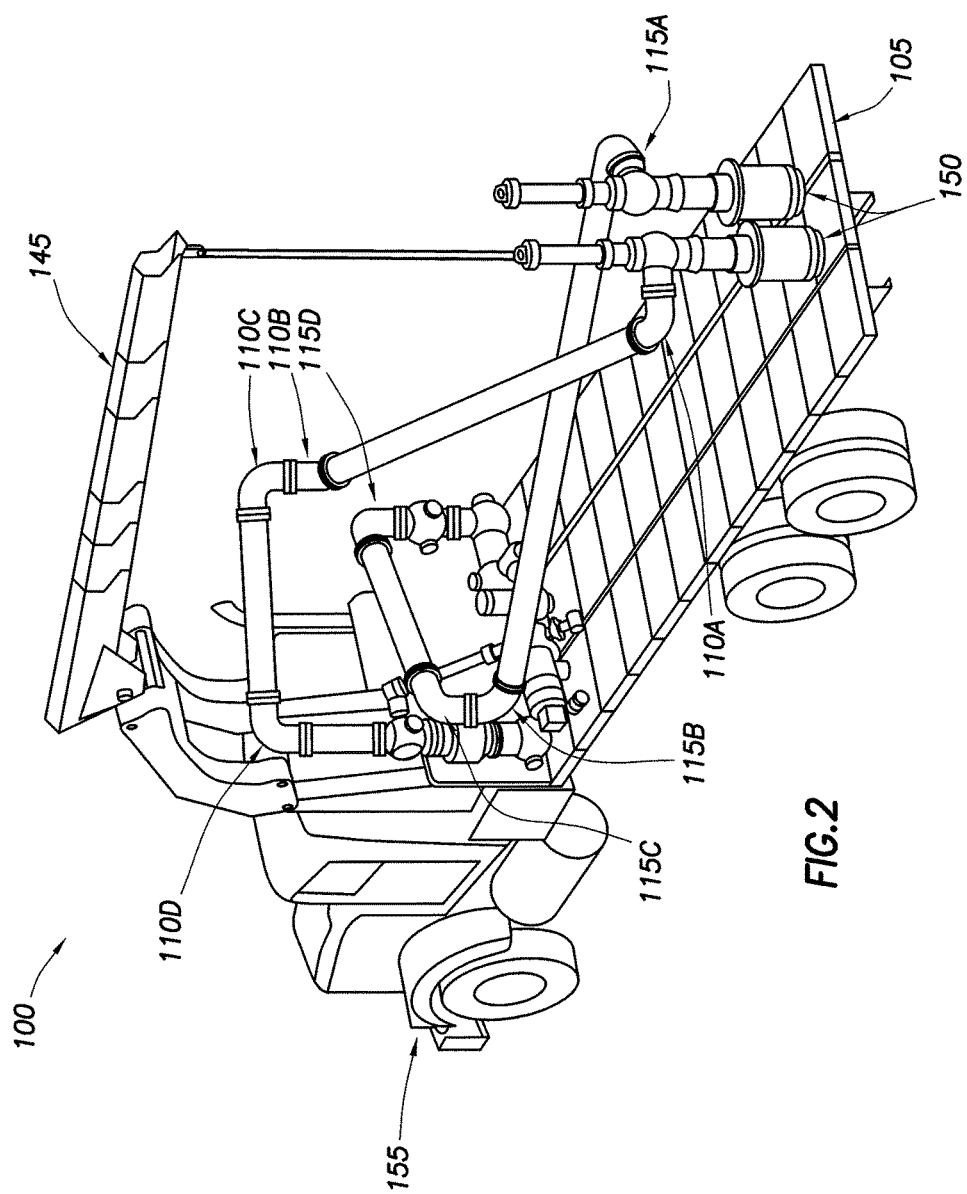
FIG. 2 illustrates a schematic perspective view of one example plug and pump system with the piping in a retracted position, in accordance with certain embodiments of the present disclosure.

As shown in FIG. 1, the well interface 110 and the manifold interface 115 are shown in extended positions. FIG. 2, by contrast, shows a schematic perspective view of example plug and pump system 100 with piping in a retracted position, in accordance with certain embodiments of the present disclosure. A retracted position facilitates storage and/or transport of the plug and pump system 100.

The plug and pump system 100 may comprise high-capacity, lightweight couplings, such as swivels and elbows. By way of example without limitation, the elbow assemblies may be capable of bearing fluids flowing at rates of over about 50 or 100 BPM and withstanding fluid pressures of over about 5,000 or 10,000 psi wp. The couplings may be relatively lightweight may facilitate the overall weight of the lines may be supported by the structure of the lines and the lift of the crane.

Each of the well interface 110 and the manifold interface 115 may allow for multiple, adjustable orientations of the well interface 110 and the manifold interface 115 that may facilitate arrangement of the plug and pump system 100 and connections to the docking station 135 and to the wellhead 140. As depicted, the well interface 110 may include multiple swivel assemblies and elbows 110A 110B, 110C, and 110D, with at least one face of each elbow providing a point of articulation. In similar fashion, the manifold interface 115 may include multiple swivel assemblies and elbows 115A, 115B, 115C, and 115D, with at least one face of each elbow providing a point of articulation. One or more of the elbows may include one or more swivels configured to allow rotational positioning of the adjoining pieces.

As depicted, each of the well interface 110 and the manifold interface 115 includes five points of articulation. However, it should be understood that alternative embodiments may include 1, 2, 3, 4, or any number of points of articulation, as may be desired. Accordingly, the well interface 110 and the manifold interface 115 may be capable of adjustable extension and retraction and may be adjustable to accommodate equipment connections in spite of parking misalignment, for example. In addition, the well interface 110 and the manifold interface 115 may be adjustable to accommodate variations in elevations and positions of the equipment, including docking station and wellhead positions. Thus, the well interface 110 and the manifold interface 115 may provide flexibility in the configuration of the piping between the wellhead 140 and the docking station 135, thereby being adaptable to the site-specific dimensions and layout.

Accordingly, the docking station line 120 and the wellhead line 130 may each comprise several straight discharge joints, connected by elbows, swivels, or other couplings. The components of each line may be assembled prior to transportation of the plug and pump system 100 to the job site. The swivels may allow the lines of the plug and pump system to conform to the dimensions and layout of the job site without the added steps of separating and reconnecting the components of the lines. The plug and pump system 100 may be rigged up and rigged down without any separating or reconnecting of the components of the lines. This may, thereby, minimize on-site labor, time, and opportunities for injury. In some instances, it may be beneficial to assemble or disassemble components of the plug and pump system 100 at the job site.

The interface equipment 125 may include prime-up/bleed-down chokes, pop-off relief valves, remote control valves, radioactive densometers, pressure transducer ports, and other equipment typically used in conjunction with pumping jobs. Exemplary interface equipment 125 may include 7-inch, 10,000 psi wp densometers. Integrating such equipment into the plug and pump system 100 may reduce on-site installations, thereby saving time and minimizing opportunities for injuries at the well site.

The plug and pump system 100 may also include one or more holding tanks (not shown). The one or more holding tanks may receive waste fluid from one or more of pre-job pump priming, post-job bleed-down of the high pressure lines, and fluid from the pop-off relief valve in case of overpressure. The one or more holding tanks may be mounted on the platform or under the platform. The one or more holding tanks may be gravity-drained to a pit, or the draining could be pump-assisted. Additionally, although not shown, the system may also include multiple or supplemental out-riggers for added stability, which may be especially advantageous in embodiments with larger cranes.

One or more of the swivels may be pressure-locking swivel assemblies. For example, two to five of the swivels in each of the well interface 110 and the manifold interface 115 may be pressure-locking swivel assemblies. A pressure-locking swivel assembly may be rotatable in a free, or relatively free, manner when not internally pressurized. But, when sufficiently pressurized fluid bears on the interior of the pressure-locking swivel assembly, the assembly may lock a piping connection in place or at least inhibit its rotational movement with respect to the assembly. Pressure-locking swivel assemblies provide the benefit of being relatively compact in length. As an additional benefit, pressure-locking swivel assemblies may weigh considerably lower than the standard ball bearing type of swivel. The compact geometry and lower weight of the pressure-locking swivel assemblies facilitate storage and deployment of the well interface 110 and the manifold interface 115.

Figure 3:
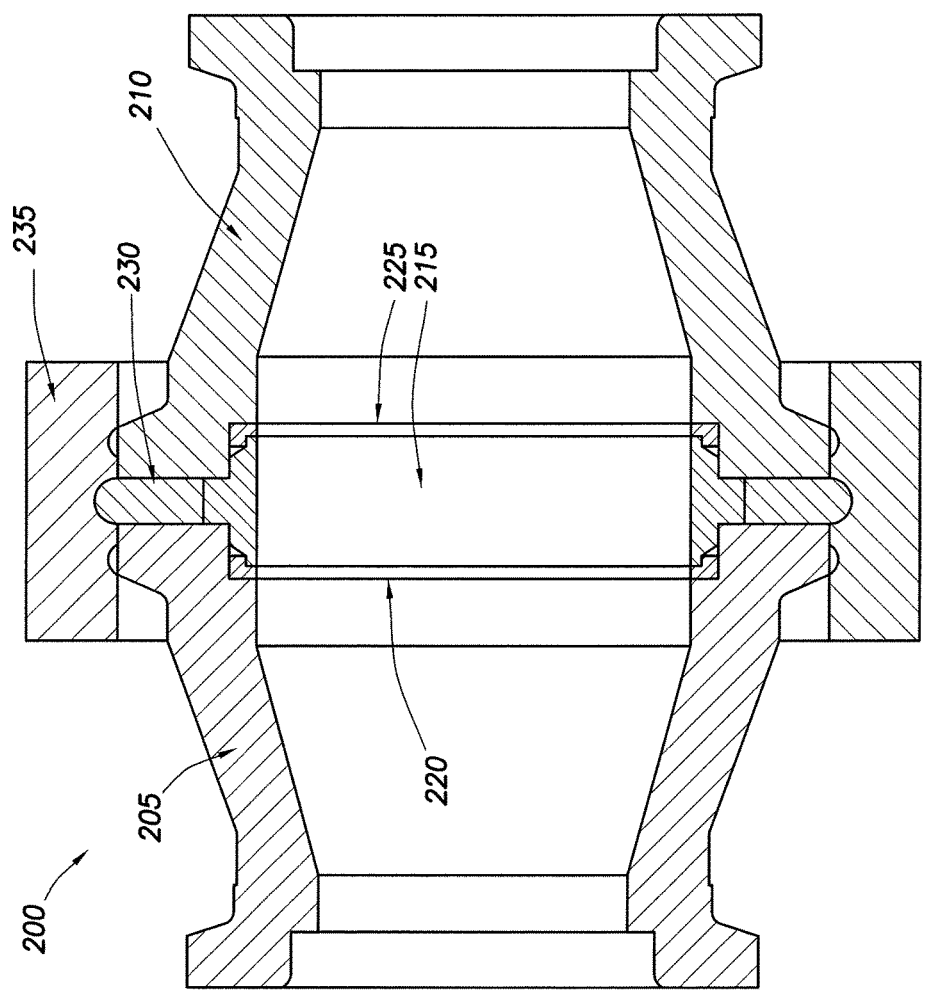
FIG. 3 shows a cross-sectional view of a pressure-locking swivel assembly in accordance certain exemplary embodiments of the present disclosure.
Figure 4:
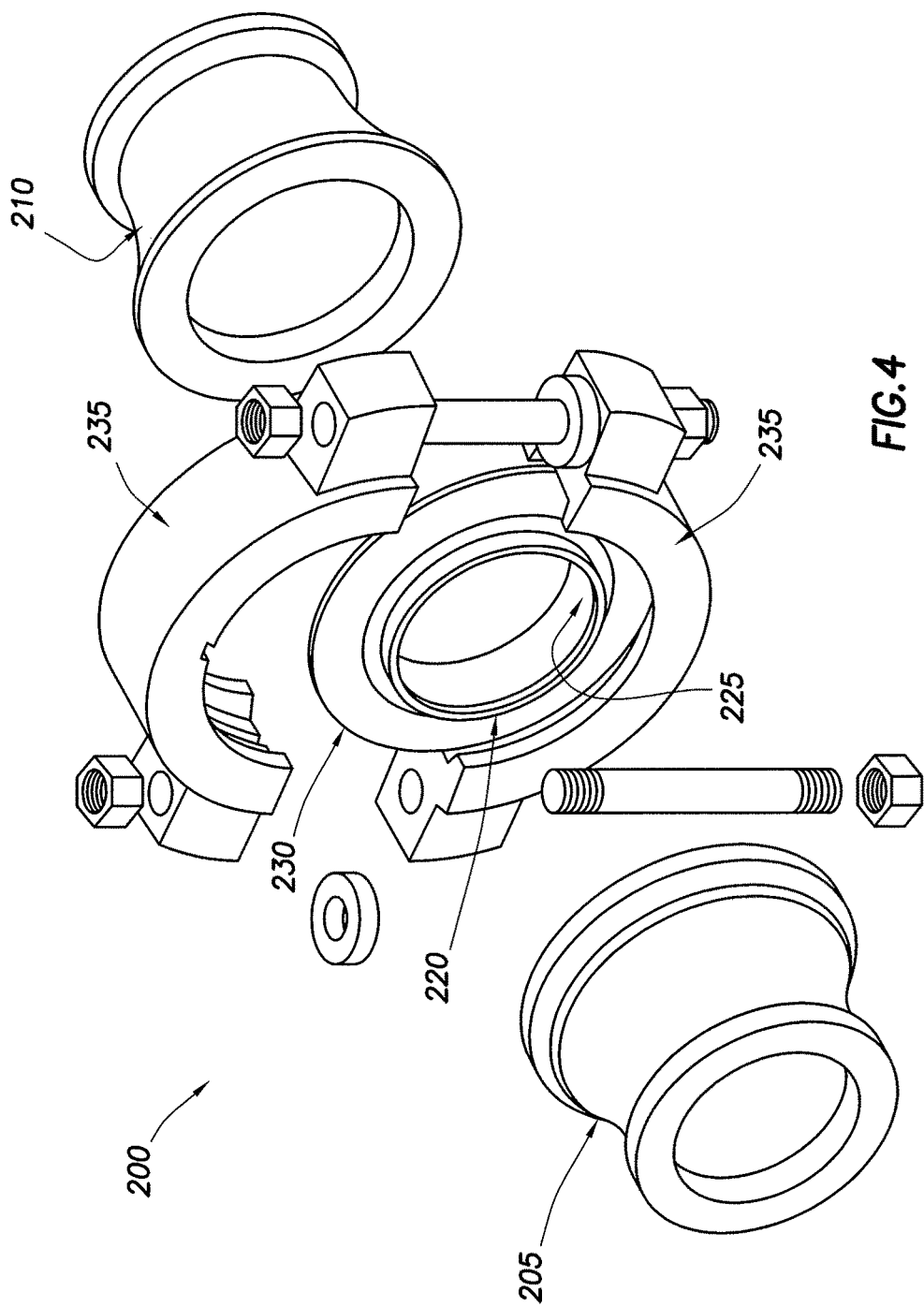
FIG. 4 shows an exploded view of that pressure-locking swivel assembly.

FIG. 3 shows a cross-sectional view of a pressure-locking swivel assembly 200 in accordance certain exemplary embodiments of the present disclosure. FIG. 4 shows an exploded view of the pressure-locking swivel assembly 200. The pressure-locking swivel assembly 200 may include two tapered hubs 205 and 210, which may be generally opposed to one another. Each hub 205 and 210 may include a cylindrical seal pocket or cavity therein. In the exemplary embodiments of FIGS. 3 and 4, one or both of the hubs 205 and 210 may be elbows, straight joints or tee-joints, such as those disclosed previously with respect to FIGS. 1 and 2, or cross joints, wye-joints, or laterals.

The pressure-locking swivel assembly 200 may have a bolted external retainment assembly. A seal-retaining member 215 may be disposed between the hubs 205 and 210. The seal-retaining member 215 may be made of a non-galling alloy that facilitates alignment of the hubs 205 and 210.

Elastomeric seals 220 and 225 may be respectively disposed between the hubs 205 and 210 and the seal-retaining member 215. In addition to what is depicted, various alternative seal arrangements may be implemented in the pressure-locking swivel assembly 200. An alignment ring 230 may be disposed between the hubs 205 and 210 and about the seal-retaining member 215 to provide radial support to the seal-retaining member 215, particularly under extreme pressure conditions where radially directed forces bear on the seal-retaining member 215.

An external retainment assembly 235 about the hubs 205 and 210 and about the seal-retaining member 215 may be provided to retain the various parts. The external retainment assembly 235 may be a multi-piece external retainment assembly and may have a bolted configuration to provide retainment, as depicted in FIG. 4 for example, and may include various bolts, nuts, washers, and other retainment members. The external retainment assembly 235 may have recesses for receiving the alignment ring 230, and the alignment ring 230 may facilitate axial alignment of the external retainment assembly 235 with the longitudinal axis of the circular portions of the hubs 205 and 210. The alignment ring 230 also may assure distribution of spacing or clearance between the external retainment assembly 235 and the hubs 205 and 210 to allow for rotation under no-pressure conditions. The bearing surfaces between the hubs 205 and 210 and the external retainment assembly 235 may have a 25-degree, or approximately 25-degree, angle, as depicted. However, that angle could vary depending on implementation.

As internal pressure is applied to the pressure-locking swivel assembly 200, resulting forces tend to separate the hubs 205 and 210 and force the hubs 205 and 210 against the matching angled surfaces of the external retainment assembly 235. With the increased forces of the internal pressure, the bearing forces of the hubs 205 and 210 and the external retainment assembly 235 increase. Increases in resistance to rotation of the hubs 205 and 210 correspond to increases of internal pressure. With sufficient internal pressure, the pressure-locking swivel assembly 200 has sufficient resistance to lock the assembly 200 in position.

Figure 5:
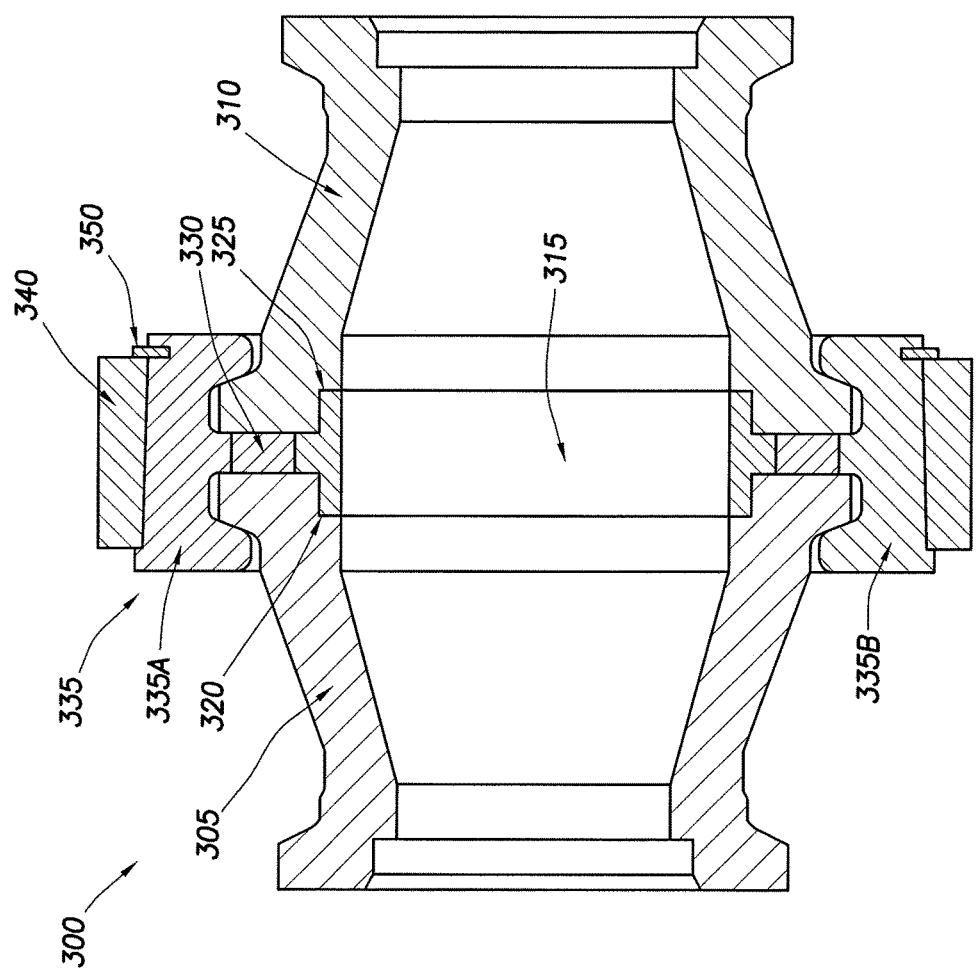
FIG. 5 shows a cross-sectional view of another pressure-locking swivel assembly in accordance certain exemplary embodiments of the present disclosure.

FIG. 5 shows a cross-sectional view of a pressure-locking swivel assembly 300 in accordance certain exemplary embodiments of the present disclosure. FIG. 6 shows an exploded view of the pressure-locking swivel assembly 300. Similar to assembly 200, the pressure-locking swivel assembly 300 may include two tapered hubs 305 and 310, which may be generally opposed to one another. Each hub 305 and 310 may include a cylindrical seal pocket or cavity therein. In the exemplary embodiments of FIGS. 5 and 6, one or both of the hubs 305 and 310 may be elbows, straight joints or tee-joints, such as those disclosed previously with respect to FIGS. 1 and 2, or cross joints, wye-joints, or laterals.

The pressure-locking swivel 300 may be a boltless configuration. A seal-retaining member 315 may be disposed between the hubs 305 and 310. The seal-retaining member 315 may be made of a non-galling alloy that facilitates alignment of the hubs 305 and 310. Elastomeric seals 320 and 325, such as O-rings, may be respectively disposed between the hubs 305 and 310 and the seal-retaining member 315. In addition to what is depicted, various alternative seal arrangements may be implemented in the pressure-locking swivel assembly 300. An alignment ring 330 may be disposed between the hubs 305 and 310 and about the seal-retaining member 315 to provide radial support to the seal-retaining member 315, particularly under extreme pressure conditions that would otherwise cause the seal-retaining member 315 to expand.

An external retainment assembly 335 about the hubs 305 and 310 and about the seal-retaining member 315 may be provided to retain the various parts. The external retainment assembly 335 may have two or more retainer portions 335A and 335B, as well as a containment ring 340 and a retainment ring 350. The containment ring 340 may have one or more internal tapered surfaces that bear against matching external tapered surfaces of the retainer portions 335A and 335B to position the retainer portions 335A and 335B near the hubs 305 and 310 and near or against the alignment ring 330. While the tapered surfaces may be beneficial to the assembly, certain embodiments may have different forms, e.g., cylindrical surfaces. The retainment ring 350 may retain the containment ring 340 in position.

One or more inner surfaces of the external retainment assembly 335 abut one or more corresponding external surfaces of the alignment ring 330, and the alignment ring 330 may facilitate axial alignment of the external retainment assembly 335 with the longitudinal axis of the circular portions of the hubs 305 and 310. The alignment ring 330 also may assure distribution of spacing or clearance between the external retainment assembly 335 and the hubs 305 and 310 to allow for rotation under no-pressure conditions. The bearing surfaces between the hubs 305 and 310 and the external retainment assembly 335 may have a 25-degree, or approximately 25-degree, angle, as depicted. However, that angle could vary depending on implementation.

As internal pressure is applied to the pressure-locking swivel assembly 300, resulting forces tend to separate the hubs 305 and 310 and force the hubs 305 and 310 against the matching angled surfaces of the external retainment assembly 335. With the increased forces of the internal pressure, the bearing forces of the hubs 305 and 310 and the external retainment assembly 335 increase. Increases in resistance to rotation of the hubs 305 and 310 correspond to increases of internal pressure. With sufficient internal pressure, the pressure-locking swivel assembly 300 has sufficient resistance to lock the assembly 300 in position.

As would be understood by one of ordinary skill in the art with the benefit of this disclosure, the configuration of the mountings on the platform 105 may vary, and certain configurations may provide advantages specific to certain applications. For example, FIGS. 1 and 2 illustrate one configuration of platform mountings, referred to as fore-mounted. Alternative configurations of platform mountings, such as an aft-mounted configuration, may be employed. Other configurations may also be utilized to provide for enhanced stability during operations or transportation, weight distribution, manufacturing or transportation efficiencies, and accessibility to the piping, crane, quick connectors, or other equipment.

In some embodiments, the piping may be generally self-supporting. For example, as illustrated in FIG. 1, the docking station line 120 connects to the docking station 135 at one end and to the interface equipment 125 at the other end, and is self-supporting between the two end-connections. In some embodiments, the crane 145 may be utilized to provide additional support and stability to the piping. For example, as illustrated in FIG. 1, the wellhead line 130 connects to the interface equipment 125 at one end and to the wellhead 140 at the other end, and is supported and stabilized by the crane 145.

In accordance with embodiments of the present invention, a method of the present invention may comprise attaching a docking station line to a discharge manifold of a docking station, attaching a wellhead line to a wellhead, performing a pumping job, detaching the wellhead line from the wellhead, and detaching the docking station line from the gathering manifold. In some embodiments, a crane may be utilized to lift and position the docking station line, the wellhead line, or both, during either the attaching or detaching steps. In certain embodiments, the crane may remain attached to the wellhead line during the pumping job.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A plug and pump system for routing pressurized fluid from a fluid source, the system comprising:
   a platform;
   a wellhead interface mounted on the platform and comprising multiple points of articulation, wherein a wellhead line of the wellhead interface is configured to connect to one or more wellheads;
   a manifold interface mounted on the platform and comprising multiple points of articulation, wherein the manifold interface comprises one or more swivel assemblies, one or more elbows and a docking station line, wherein the docking station line of the manifold interface is configured to connect to a docking station, wherein the manifold interface is capable of adjustable extension and retraction relative to a position of the platform to adapt to variations in positions of the docking station and the one or more wellheads; and wherein the manifold interface and the wellhead interface are configured to route the pressurized fluid between the docking station and the one or more wellheads from the position of the platform, wherein the wellhead interface and the manifold interface are each separately supported by the platform.

2. The system of claim 1, further comprising a vehicle on which the platform is mounted.

3. The system of claim 1, further comprising interface equipment mounted on the platform, wherein the interface equipment is configured to allow the pressurized fluid to flow between the interface equipment and at least one of the manifold interface and the wellhead interface.

4. The system of claim 1, further comprising a crane mounted directly on the platform and configured to support at least a portion of one or both of the manifold interface and the wellhead interface.

5. The system of claim 1, further comprising a crane mounted directly on the platform and configured to support at least a portion of each of the manifold interface and the wellhead interface.

6. The system of claim 1, wherein at least one of the points of articulation is a swivel joint configured to inhibit articulation when the pressurized fluid flows therethrough.

7. A mobile plug and pump system for routing pressurized fluid from a fluid source, the system comprising
a vehicle;
a wellhead interface including a first articulating piping assembly mounted on the vehicle and comprising a first swivel assembly, wherein a wellhead line of the wellhead interface is configured to connect to one or more wellheads; and
a manifold interface including a second articulating piping assembly mounted on the vehicle and comprising a second swivel assembly, wherein a docking station line of the manifold interface is configured to connect to a docking station, wherein the manifold interface is capable of adjustable extension and retraction relative to a position of the vehicle to adapt to variations in positions of the docking station and the one or more wellheads;
wherein the first articulating piping assembly and the second articulating piping assembly are configured to cooperatively route the pressurized fluid between the docking station and the one or more wellheads from the position of the vehicle,
wherein the wellhead interface and the manifold interface are each separately supported by the platform.

8. The system of claim 7, wherein the first and second articulating piping assemblies are retractable for transport on the vehicle.

9. The system of claim 7, further comprising a crane mounted directly on the vehicle and configured to support at least a portion of one or both of the first and second articulating piping assemblies.

10. The system of claim 9, wherein the crane is retractable for transport on the vehicle.

11. The system of claim 7, further comprising interface equipment mounted on the vehicle, wherein the interface equipment is configured to allow the pressurized fluid to flow between the interface equipment and at least one of the first and second articulating piping assemblies.

12. The system of claim 7, further comprising a crane mounted directly on the vehicle and configured to support at least a portion of each of the manifold interface and the wellhead interface.

13. The system of claim 7, wherein at least one of the first or second articulating pipe assemblies includes a swivel joint configured to inhibit articulation when the pressurized fluid flows therethrough.

14. A method for routing pressurized fluid from a fluid source, the method comprising:
attaching a docking station line of a manifold interface of a plug and pump system to a docking station;
attaching a wellhead line of a wellhead interface of the plug and pump system to a first wellhead;
routing the pressurized fluid between the docking station and the first wellhead through the docking station line and the wellhead line, wherein the plug and pump system comprises:
a platform;
the manifold interface mounted on the platform and comprising a first swivel assembly;
the wellhead interface mounted on the platform and comprising a second swivel assembly; and
wherein:
the manifold interface is capable of adjustable extension and retraction relative to a position of the platform to adapt to variations in positions of the docking station and the first wellhead; and
the docking station line and the wellhead line are configured to allow the pressurized fluid to flow between the two lines;
attaching the wellhead line of the wellhead interface of the plug and pump system to a second wellhead from the position of the platform that is same as the position of the platform when the wellhead line is attached to the first wellhead; and
routing the pressurized fluid between the docking station and the second wellhead through the docking station line and the wellhead line,
wherein the wellhead interface and the manifold interface are each separately supported by the platform.

15. The method of claim 14, further comprising:
detaching the wellhead line from the second wellhead; and
detaching the docking station line from the docking station.

16. The method of claim 14, wherein the attaching the docking station line comprises at least partially lifting the docking station line with a crane of the plug and pump system.

17. The method of claim 14, wherein the attaching the wellhead line to the first or second wellhead comprises at least partially lifting the wellhead line with a crane of the plug and pump system.

18. The method of claim 17, wherein the crane remains attached to the wellhead line during the step of routing the pressurized fluid.

19. The method of claim 14, wherein attaching the wellhead line to the first or second wellhead comprises:
attaching a flange adapter to the respective first or second wellhead; and
attaching a quick connector having a conical shaped seal at the end of the wellhead line to the flange adapter.

20. The method of claim 14, wherein the attaching the wellhead line of the wellhead interface to the first or the second wellhead comprises adjusting at least one point of articulation of at least one of the manifold interface or the wellhead interface.

\* \* \* \* \*